(12) United States Patent
Fischbein et al.

(10) Patent No.: US 10,479,280 B2
(45) Date of Patent: Nov. 19, 2019

(54) MOTOR VEHICLE

(71) Applicant: Ford Global Technologies, LLC, Dearborn, MI (US)

(72) Inventors: Igor Fischbein, Cologne (DE); James Neugebauer, Chelmsford (GB); Torsten Gerhardt, London (GB); Bruce Southey, Farnham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 15/980,827

(22) Filed: May 16, 2018

(65) Prior Publication Data
US 2018/0370443 A1 Dec. 27, 2018

(30) Foreign Application Priority Data

Jun. 27, 2017 (DE) .................... 10 2017 210 831

(51) Int. Cl.
*B60R 5/04* (2006.01)
*B60J 5/10* (2006.01)
*B62D 33/027* (2006.01)

(52) U.S. Cl.
CPC ............. *B60R 5/048* (2013.01); *B60J 5/101* (2013.01); *B60J 5/102* (2013.01); *B60J 5/104* (2013.01); *B60R 5/042* (2013.01); *B62D 33/027* (2013.01)

(58) Field of Classification Search
CPC .... B62D 33/027; B62D 33/0273; B60J 5/104; B60J 5/106; B60J 5/108; B60J 5/101–104; B60R 5/041; B60R 5/042; B60R 5/048

USPC .......................................... 296/26.08, 26.11
See application file for complete search history.

(56) References Cited

U.S. PATENT DOCUMENTS

| 2,848,271 A | * | 8/1958 | Reilly | .................... B60R 5/042 |
| | | | | 296/37.1 |
| 3,082,033 A | * | 3/1963 | Bosher | .................... B60R 5/042 |
| | | | | 296/26.02 |
| 3,107,649 A | * | 10/1963 | Blend, Jr. | ............ A01K 1/0272 |
| | | | | 119/496 |

(Continued)

FOREIGN PATENT DOCUMENTS

| DE | 3025145 A1 | 3/1982 |
| EP | 0556472 A2 | 12/1992 |

(Continued)

*Primary Examiner* — Gregory A Blankenship
(74) *Attorney, Agent, or Firm* — Vichit Chea; Price Heneveld LLP

(57) ABSTRACT

A motor vehicle is provided with a luggage compartment opening arranged at the rear of a body of the motor vehicle, and a tailgate arranged pivotably on the body and in a closed position closes the luggage compartment opening and in an open position at least partially opens the luggage compartment opening. In order to provide a motor vehicle with a luggage compartment of variable size, the motor vehicle comprises a cover attached to a vehicle portion of the motor vehicle adjacent to the luggage compartment opening and/or defining the luggage compartment opening, and which is made of a flexible material and is configured and arranged such that, in the open position of the tailgate or by pivoting of the tailgate into the open position, it can be transferred from a compact rest state into an extended function state.

18 Claims, 19 Drawing Sheets

(56) References Cited

U.S. PATENT DOCUMENTS

| | | | | |
|---|---|---|---|---|
| 3,479,079 A * | 11/1969 | Coursault | ............... | B60P 3/423 296/26.06 |
| 3,879,080 A * | 4/1975 | Freeman | ................. | B60R 5/042 296/26.06 |
| 4,132,444 A * | 1/1979 | Beggs | ................... | B60P 3/341 296/26.11 |
| 4,223,939 A * | 9/1980 | Beggs | ................... | B60P 3/341 296/26.11 |
| 4,544,195 A * | 10/1985 | Gunn | .................... | B60P 3/341 135/88.09 |
| 5,385,298 A * | 1/1995 | Griggs | ................... | F24V 40/00 237/1 R |
| 5,544,799 A | 8/1996 | Didlake | | |
| 6,871,896 B1 * | 3/2005 | Owen | .................... | E04H 15/06 135/88.05 |
| 7,077,453 B1 * | 7/2006 | Walker | ..................... | B60R 5/04 296/26.06 |
| 2005/0001442 A1 * | 1/2005 | Cuma | ..................... | B60J 5/101 296/26.09 |
| 2008/0185870 A1 * | 8/2008 | Leroy | .................... | B60R 5/041 296/182.1 |
| 2008/0238122 A1 * | 10/2008 | Leopold | .................. | B60R 5/041 296/56 |
| 2008/0277956 A1 * | 11/2008 | Karuppaswamy | ...... | B60R 5/041 296/37.1 |
| 2009/0140544 A1 * | 6/2009 | Pollak | ..................... | B60J 5/103 296/186.3 |
| 2010/0206929 A1 | 8/2010 | Perry | | |
| 2014/0291366 A1 * | 10/2014 | Nelson | .................... | B60R 9/065 224/404 |
| 2018/0072144 A1 * | 3/2018 | Huang | .................. | B62D 25/10 |
| 2018/0370443 A1 * | 12/2018 | Fischbein | .............. | B60R 5/048 |
| 2018/0370453 A1 * | 12/2018 | Gerhardt | ................. | B60R 9/065 |

FOREIGN PATENT DOCUMENTS

| | | |
|---|---|---|
| EP | 2368765 A1 | 9/2011 |
| FR | 2845053 A1 | 4/2004 |
| GB | 507800 | 6/1939 |
| GB | 2512096 A | 9/2014 |

* cited by examiner

MOTOR VEHICLE

FIELD OF THE INVENTION

The present invention generally relates to motor vehicles, and more particularly relates to a motor vehicle with a luggage compartment opening arranged at the rear of a body of the motor vehicle, and a tailgate arranged pivotably on the body to open and close the luggage compartment opening.

BACKGROUND OF THE INVENTION

Motor vehicles with a hatchback commonly have at the rear a luggage compartment which can be closed with a tailgate. In small vehicles in particular, the loading space available is relatively small. If a larger object, which cannot be arranged fully inside the existing luggage compartment, is transported with such a small vehicle, normally the tailgate cannot be completely closed. When this occurs during a journey, the tailgate must either remain in the open position or be secured in an intermediate position via a strap or similar device. In both cases, a gap typically remains between the tailgate and the body or luggage compartment opening, via which exhaust gases, travel wind turbulence or particles for example can enter the luggage compartment, particularly during travel. Also, precipitation, such as rain, can penetrate the luggage compartment. This may adversely affect driving comfort of the small vehicle, which may unsettle the driver. Also, exhaust gases entering the luggage compartment may reach the passenger compartment of a small vehicle, which should be avoided.

In order to be able to transport a large object with a motor vehicle, it is generally known for example from U.S. Patent Application Publication No. 2010/0206929 A1; U.S. Pat. No. 5,544,799, EP 2368765 A1 and GB 2512096 A to arrange a load carrier on the rear of the motor vehicle, to which the large object can be fixed.

FR 2845053 A1 describes using, in its open position, a lower tailgate element of a tailgate, divided horizontally into two pieces, as a luggage compartment floor extension, and arranging a peripheral side wall on the lower tailgate element in order to provide lateral retention for an object laid or placed on the lower tailgate element. However, the luggage compartment remains open to the environment, which is associated with the above disadvantages.

EP 0556472 A2 and DE 3025145 A1 each describe a motor vehicle in which the rear part can be varied for transporting large objects.

U.S. Patent Application Publication No. 2008/0238122 A1 discloses a tailgate arrangement of a motor vehicle, in particular a car, with a luggage compartment extension element which is arranged on the inside of the tailgate and surrounds a cavity, and which is or can be connected in a gas-tight and water-tight fashion to a luggage compartment of the motor vehicle in order to extend, and which can be clamped between the tailgate and a rear carrier arranged on the rear of the vehicle.

It would be desirable to provide a motor vehicle with a luggage compartment of variable size, in which the above-mentioned disadvantages do not occur.

SUMMARY OF THE INVENTION

According to one aspect of the present invention, a motor vehicle comprises at least one cover, which is attached to a vehicle portion of the motor vehicle adjacent to the luggage compartment opening and/or defining the luggage compartment opening, and which is made of a flexible material and is configured and arranged such that, in the open position of the tailgate or by pivoting of the tailgate into the open position, the cover can be transferred from a compact rest state in which the cover is arranged space-savingly on the vehicle portion, into an extended function state, in which the cover is also connected to the tailgate and at least partially surrounds a space between the tailgate and the luggage compartment opening, and vice versa.

It is to be pointed out that the features and measures specified individually in the following description may be combined with one another in any desired technically meaningful way and disclose further configurations of the vehicle. The description, in particular in conjunction with the figures, characterizes and specifies the embodiments of the vehicle further.

According to one embodiment, the existing rear luggage compartment is extended at the rear by the space present between the tailgate in its open position and the luggage compartment opening, which space is partially delimited by the tailgate in its open position and also partially or completely delimited by the cover. The space is thus preferably fully closed against the environment of the motor vehicle, so that the penetration of substances, gases and/or particles into the space, and hence into the adjacent luggage compartment, is reliably prevented.

When the tailgate is in its open position, the cover can easily be transferred manually from its compact rest state into its extended function state, in order to close the space against the environment of the motor vehicle. To do this, a user grips a portion of the cover, for example a handle in the form of a grip or similar portion, and then exerts a tension force on the cover, whereby the cover is extended, for example unfolded or unrolled. Here, the user moves a portion of the cover in the direction of the tailgate. When the tailgate has been reached, the user can connect the cover to the tailgate, wherein for this at least one connecting mechanism may be present, which can be released mechanically without destruction and is arranged partially on the cover and partially on the tailgate. The connecting mechanism may be formed for example as a catch mechanism, a snap-lock mechanism or similar. When the space is no longer required, the connecting mechanism may be released again manually and the cover transferred manually from its extended function state into its compact rest state. For this, the cover may be provided with a return function so that, on manual return to its compact rest state, the cover retracts into its compact rest state substantially automatically, in a predefined fashion. The return function may for example be achieved by an elastically deformable means arranged on the cover. A return force generated via the return function is preferably lower than a retention force applied by a retention mechanism to retain the tailgate in its open position, for example comprising gas struts or an electric actuator mechanism. Alternatively, the cover may be transferred from its rest state to its function state in that the cover is connected to the tailgate in advance, for example while the tailgate is still in its closed position, and moved and transferred to its function state via a pivot movement of the tailgate. The cover may accordingly be transferred from its function state to its rest state by pivoting of the tailgate into its closed position.

The motor vehicle may comprise a single cover attached to the vehicle portion of the motor vehicle adjacent to the luggage compartment opening and/or defining the luggage compartment opening, or two or more covers which can preferably be connected together. For example, two side covers and a lower cover may be present, which can be handled or actuated individually and can be connected together at their edges, preferably in an air-tight and/or water-tight fashion. The flexible material of the cover may for example be an impregnated fabric or an impregnated textile or a plastic material.

The motor vehicle may be formed for example as a car with a hatchback, according to one embodiment. In particular, the motor vehicle may be configured as a small vehicle. It should be appreciated that the motor vehicle may be formed as other types of vehicles, according to other embodiments.

According to an advantageous embodiment, the cover is made from an air-tight and/or water-tight material. The use of an air-tight material for the cover prevents air turbulence and exhaust gases, present during travel of the motor vehicle when the tailgate is in the open position, from penetrating into the space or via the space into the luggage compartment. By alternatively or additionally designing the material of the cover to be water-tight, the penetration of precipitation or moisture thrown up at the rear into the space or luggage compartment, can be prevented.

A further advantageous embodiment provides that the cover has a fold structure so that the cover is configured to be foldable in a predefined fashion. This simplifies handling of the cover, so it is more intuitive and easier to transfer the cover from its rest state to its function state and vice versa. The fold structure may comprise predefined fault lines, so that the cover can be moved between the rest state and the function state in the manner of a concertina.

According to a further advantageous embodiment, the motor vehicle comprises at least one tensioning unit, which can be connected to the tailgate, for tensioning the cover in the extended function state. This guarantees that the cover is taut in its function state, so that for example, fluttering movements and associated noise during travel of the motor vehicle are avoided. The tensioning unit may for example have at least one tensioning bracket.

A further advantageous embodiment provides that the motor vehicle comprises at least one flexible rod, which is guided in a cavity on a vehicle structure of the motor vehicle so as to be movable between a retracted state and an extended state, and at least one receiver arranged on the tailgate to which a free end of the rod can be fixed, wherein at least one stop is arranged on the vehicle structure which cooperates with the other end portion of the rod such that the rod cannot be withdrawn completely from the cavity. This reliably prevents the flexible rod from slipping out of the cavity. The cavity may extend substantially parallel to the vehicle longitudinal direction. Via the flexible rod, the open position of the tailgate on the body can be secured.

According to a further advantageous embodiment, it is provided that on a side of the tailgate nearer to the ground, the tailgate is connected to the body via at least one hinge, and in the open position is oriented substantially horizontally. In this way, the tailgate in its open position can be used as a rear extension of the luggage compartment floor. An object can thus also be placed or laid on the tailgate. Then the cover can be transferred into its function state, wherein the cover is configured for example as a hood in its function state, and covers the tailgate in its open position from above, while leaving the space between the tailgate and the luggage compartment opening clear.

A further advantageous embodiment provides that on a side of the tailgate nearer to the ground, the tailgate has a lower tailgate element connected to the body via at least one hinge, and an upper tailgate element connected via at least one hinge to a side of the lower tailgate element further from the ground, wherein when the tailgate is in the open position, the upper tailgate element is oriented substantially horizontally and the lower tailgate element is oriented substantially either vertically or horizontally. In this way, it is possible to extend the luggage compartment of the motor vehicle and the rear in two different stages. If the lower tailgate element is oriented substantially vertically while the tailgate is in its open position, or if the lower tailgate element is in its closed position, the luggage compartment is extended at the rear only by the upper tailgate element extended substantially horizontally. If both the lower tailgate element and the upper tailgate element are oriented substantially horizontally or aligned to each other when the tailgate is in its open position, the luggage compartment is extended at the rear by both tailgate elements or by the complete tailgate. The cover may be configured and arranged such that it can cover only the upper tailgate element from above, while leaving a space, when the lower tailgate element is oriented substantially vertically, and such that it can cover both tailgate elements together from above, while leaving a space, when both tailgate elements are oriented substantially horizontally. A substantially vertical orientation of the lower tailgate element in the context of the application means an orientation of the lower tailgate element in which, for example, a main extension plane of the lower tailgate element is oriented inclined to a vertical axis of the motor vehicle by a few degrees, for example by less than 10°. Since a lower tailgate element is not usually configured flat with two parallel main side faces, the planes running through the lower tailgate element may be different and inclined by a greater or lesser extent relative to the vertical axis of the motor vehicle. Accordingly, in the context of the application, a substantially horizontal orientation of the lower tailgate element means an orientation of the lower tailgate element in which, for example, a main extension plane of the lower tailgate element is oriented inclined to a longitudinal axis of the motor vehicle by a few degrees, for example by less than 10°. This applies accordingly to the orientations of the upper tailgate element.

According to a further advantageous embodiment, on a side of the tailgate further from the ground, the tailgate has an upper tailgate element connected to the body via at least one hinge, and a lower tailgate element connected via at least one hinge to a side of the upper tailgate element nearer to the ground, wherein when the tailgate is in the open position, the upper tailgate element is oriented substantially horizontally and the lower tailgate element is oriented substantially either vertically or horizontally. In this way, the tailgate can cover from above and at the rear the space formed between the tailgate and the luggage compartment opening. Also, the tailgate may be intuitively laid around an object inserted partially in the luggage compartment, in that the tailgate, which is initially in an open position with mutually aligned tailgate elements oriented substantially horizontally to each other, is pivoted in the direction of its closed position until the upper tailgate element comes into contact with the object. Then the lower tailgate element may be pivoted relative to the upper tailgate element in the direction of the luggage compartment, for example until the lower tailgate element lies against the object at the rear. Finally, the cover may be transferred into its function state in order to partially surround the space receiving a portion of the object. Preferably, the cover surrounds the space at the sides and from below, while the space is enclosed from above and at the rear by the tailgate. Linear guides for example may be arranged on the upper tailgate element and/or in an upper region of the rear luggage compartment, along which guides the cover can be moved in the manner of a curtain.

Advantageously, the motor vehicle comprises at least one floor element which is arranged so as to be movable between a retracted position, in which the floor element is arranged completely inside a luggage compartment of the motor vehicle accessible via the luggage compartment opening, and an extended position in which the floor element protrudes at least partially to the rear out of the loading compartment. In this way, the loading floor can be extended at the rear in order to form a larger support surface for an object to be transported. The floor element may be arranged movably on the motor vehicle via at least one linear guide mechanism, wherein securing means may be present for securing the retracted and/or extended position of the floor element.

According to another aspect of the present invention, a vehicle is provided. The vehicle includes a body, a luggage compartment opening arranged at a rear of the body, a tailgate arranged pivotably on the body to pivot between closed and open positions, and a flexible cover configured to be transferred between a compact state and an extended state that at least partially surrounds a space between the tailgate and the luggage compartment opening.

These and other aspects, objects, and features of the present invention will be understood and appreciated by those skilled in the art upon studying the following specification, claims, and appended drawings.

DETAILED DESCRIPTION OF THE PREFERRED EMBODIMENTS

In the different figures, identical parts are always provided with the same reference signs, and so the parts are generally also described only once.

Figure 1:
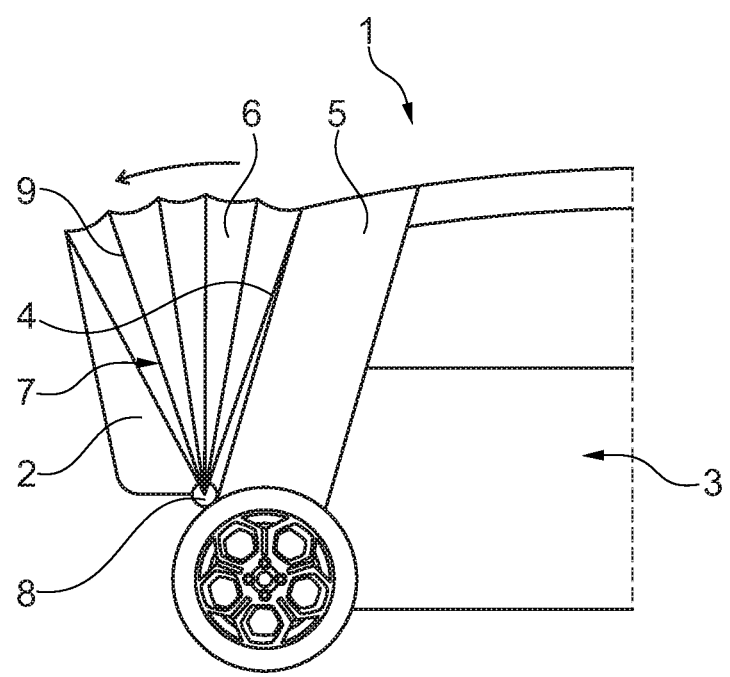
FIG. 1 is a diagrammatic side view of an exemplary embodiment of a motor vehicle according to one embodiment with a partially pivoted tailgate.

FIG. 1 shows a diagrammatic side view of an exemplary embodiment of a motor vehicle 1 according to one embodiment with a partially pivoted tailgate 2 arranged pivotably on a body 3 of the motor vehicle 1. The motor vehicle 1 also comprises a luggage compartment opening 4 arranged at the rear of the body 3, wherein the tailgate 2 in a closed position such as shown in FIG. 4 closes the luggage compartment opening 4, and in the open position, shown in FIGS. 2 and 3, opens the luggage compartment opening 4. The tailgate 2 is connected to the body 3 on a side of the tailgate 2 nearer the ground via at least one hinge (not shown). In the open position, the tailgate 2 is oriented substantially horizontally, as shown in FIGS. 2 and 3.

Furthermore, the motor vehicle 1 has a cover 6 which is attached to a vehicle portion 5 of the motor vehicle 1 adjacent to the luggage compartment opening 4 and/or defining the luggage compartment opening 4. The cover 6 may be made of a flexible, air-tight and water-tight material. The cover 6 may be configured and arranged such that by pivoting of the tailgate 2 into the open position, it can be transferred from a compact rest state, in which the cover 6 is arranged space-savingly on the vehicle portion 5, into an extended function state, shown in FIGS. 2 and 3, in which the cover 6 is connected to the tailgate 2 and at least partially surrounds a space (not shown) between the tailgate and the luggage compartment opening 4, and vice versa.

Figure 2:
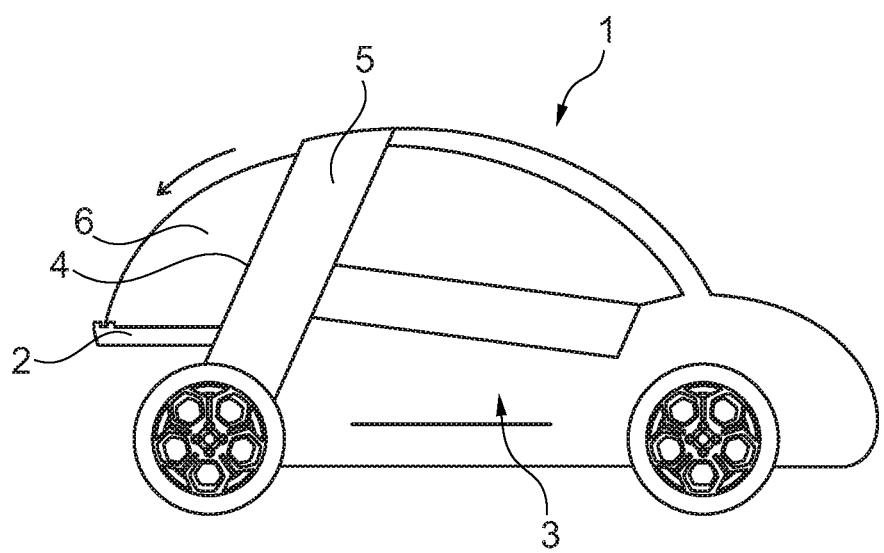
FIG. 2 is a diagrammatic side view of the motor vehicle shown in FIG. 1 with the tailgate shown in the open position.
Figure 3:
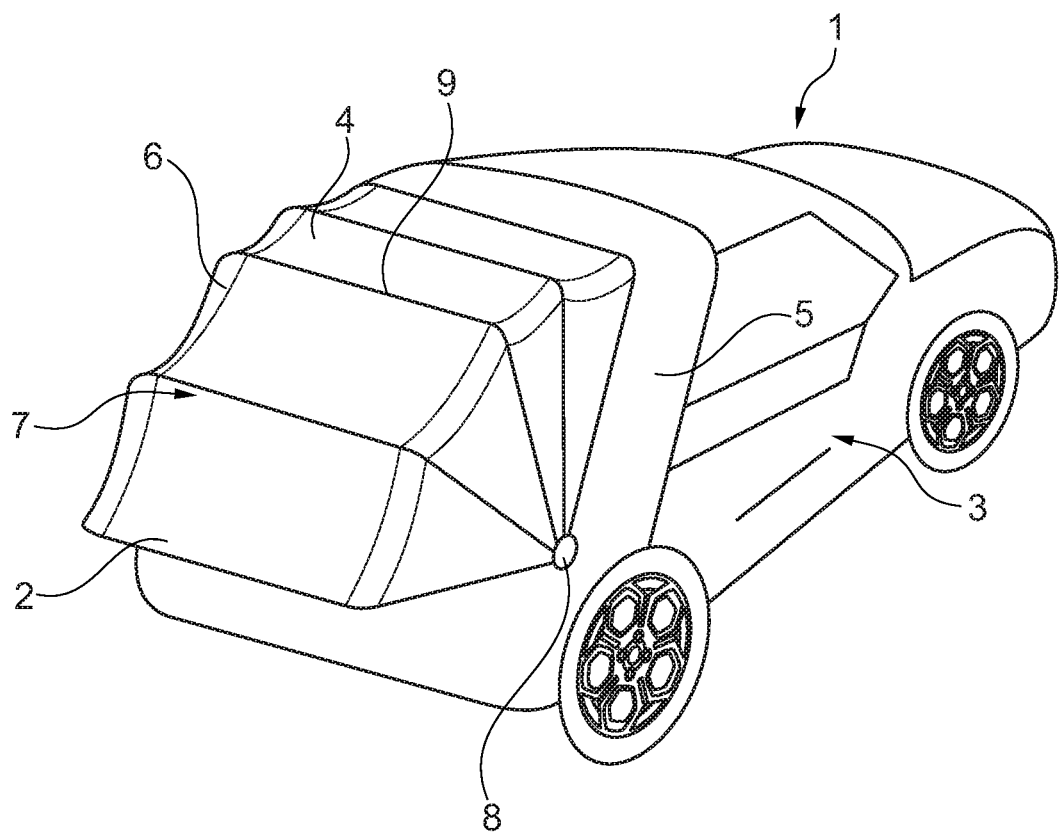
FIG. 3 is a diagrammatic perspective view of the motor vehicle shown in FIG. 2.
Figure 4:
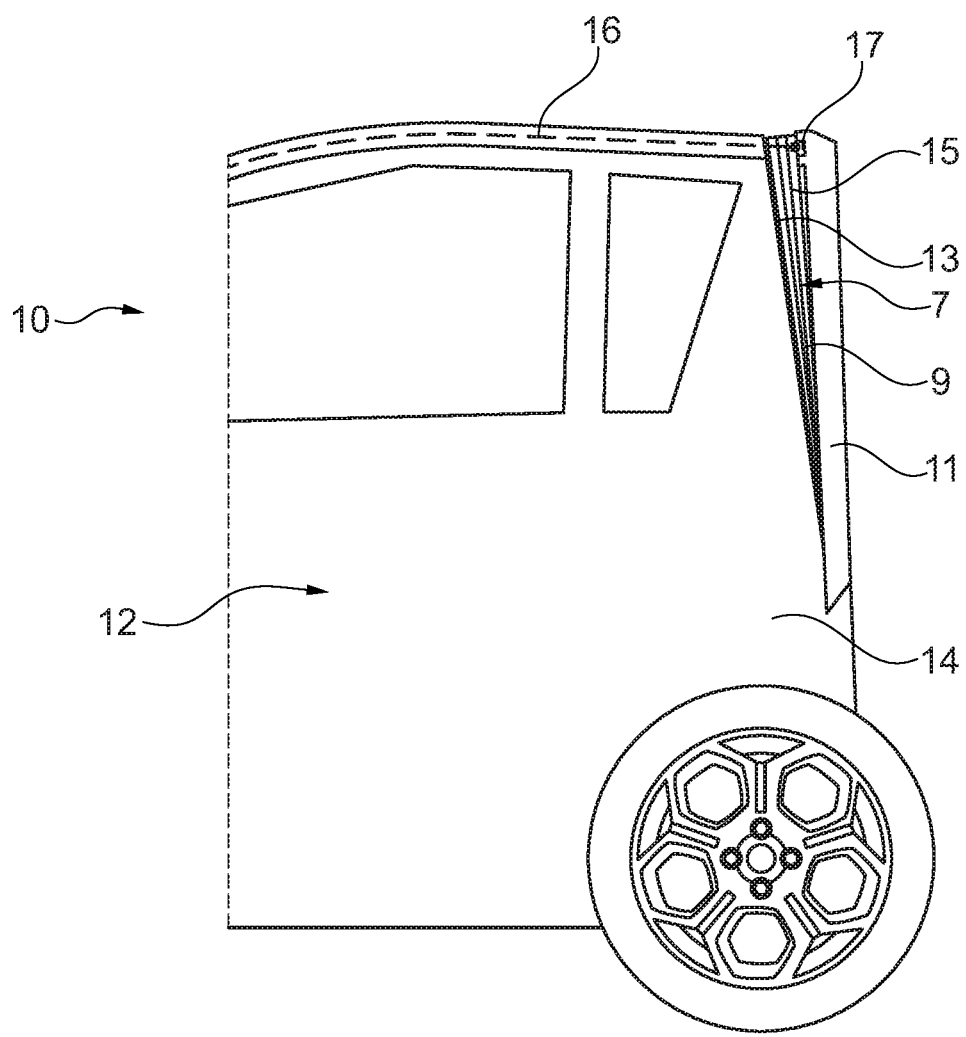
FIG. 4 is a diagrammatic side view of a further exemplary embodiment of a motor vehicle with the tailgate in the closed position.

In the exemplary embodiment shown in FIGS. 1-3, the cover 6 may be connected to the tailgate 2 in any state, so that when the tailgate 2 is pivoted into the open state, the cover 6 is necessarily transferred into the function state. For this, a closable loading/unloading opening (not shown) may be arranged on the tailgate 2 and/or on the cover 6, via which objects can be inserted into and extracted from the space between the tailgate 2 and the luggage compartment opening 4. Alternatively, the cover 6 may first be separated from the tailgate 2, so that first the tailgate 2 can be pivoted into the open position and then the cover 6 transferred into the function state. Then the cover 6 may be connected to the tailgate 2. For this, the cover 6 has an identifiable fold structure so that the cover 6 is configured to be foldable in a predefined fashion. In particular, the motor vehicle 1 has a tensioning unit 7 connected to the tailgate 2 for tensioning the cover 6 in the extended function state, wherein the tensioning unit 7 has several tensioning brackets 9 which can be pivoted via two side hinges 8.

FIG. 2 shows a diagrammatic side view of the motor vehicle 1 shown in FIG. 1 with the tailgate 2 in its open position. The tailgate 2 is oriented horizontally. The cover 6 is fully tensioned and extends the outer contour of the body 3, in order to have the minimum adverse effect on the aerodynamics of the motor vehicle 1.

FIG. 3 shows a diagrammatic perspective view of the motor vehicle 1 shown in FIG. 2. In particular, the tensioning brackets 9 of the tensioning unit 7 can be seen, each of which is formed U-shaped and via which the cover 6 is tensioned.

Figure 6:
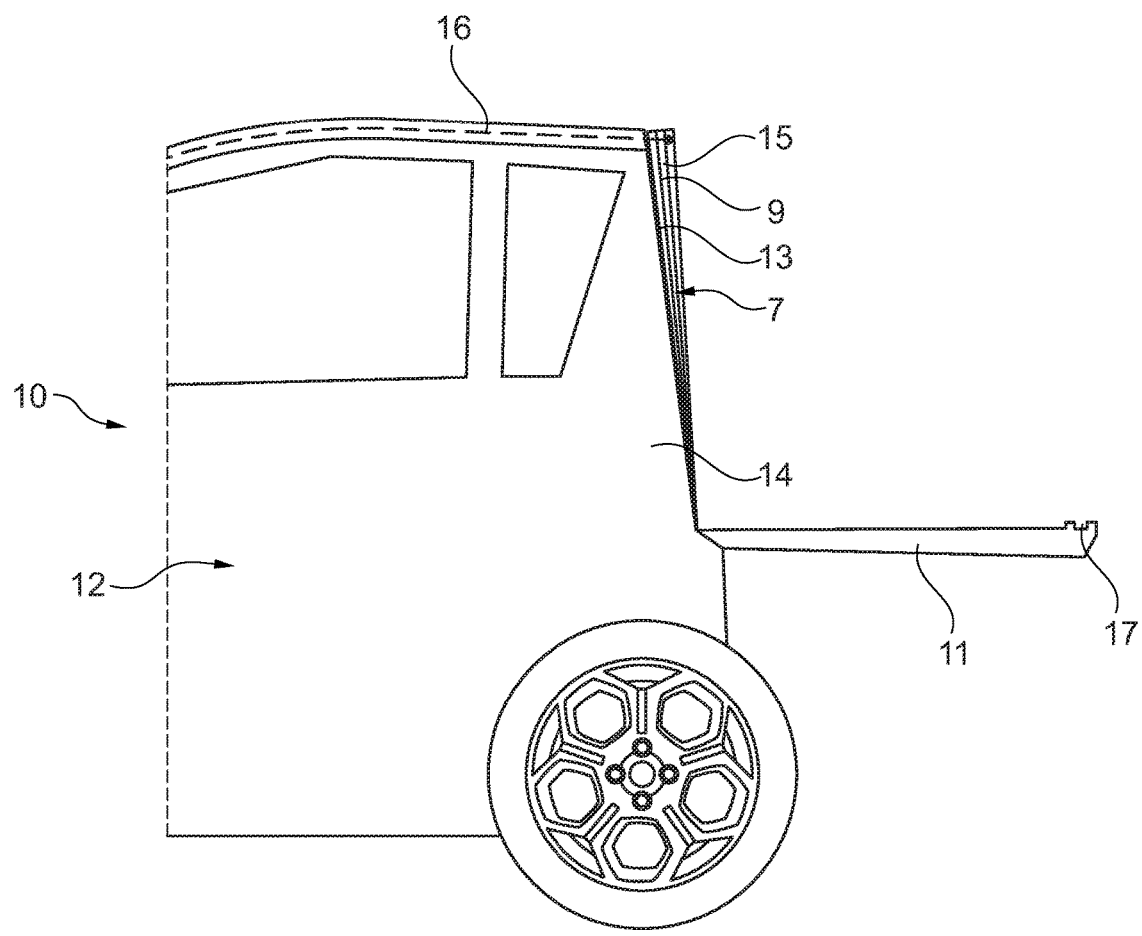
FIG. 6 is a diagrammatic side view of the motor vehicle shown in FIG. 4 with the tailgate in the open position.
Figure 8:
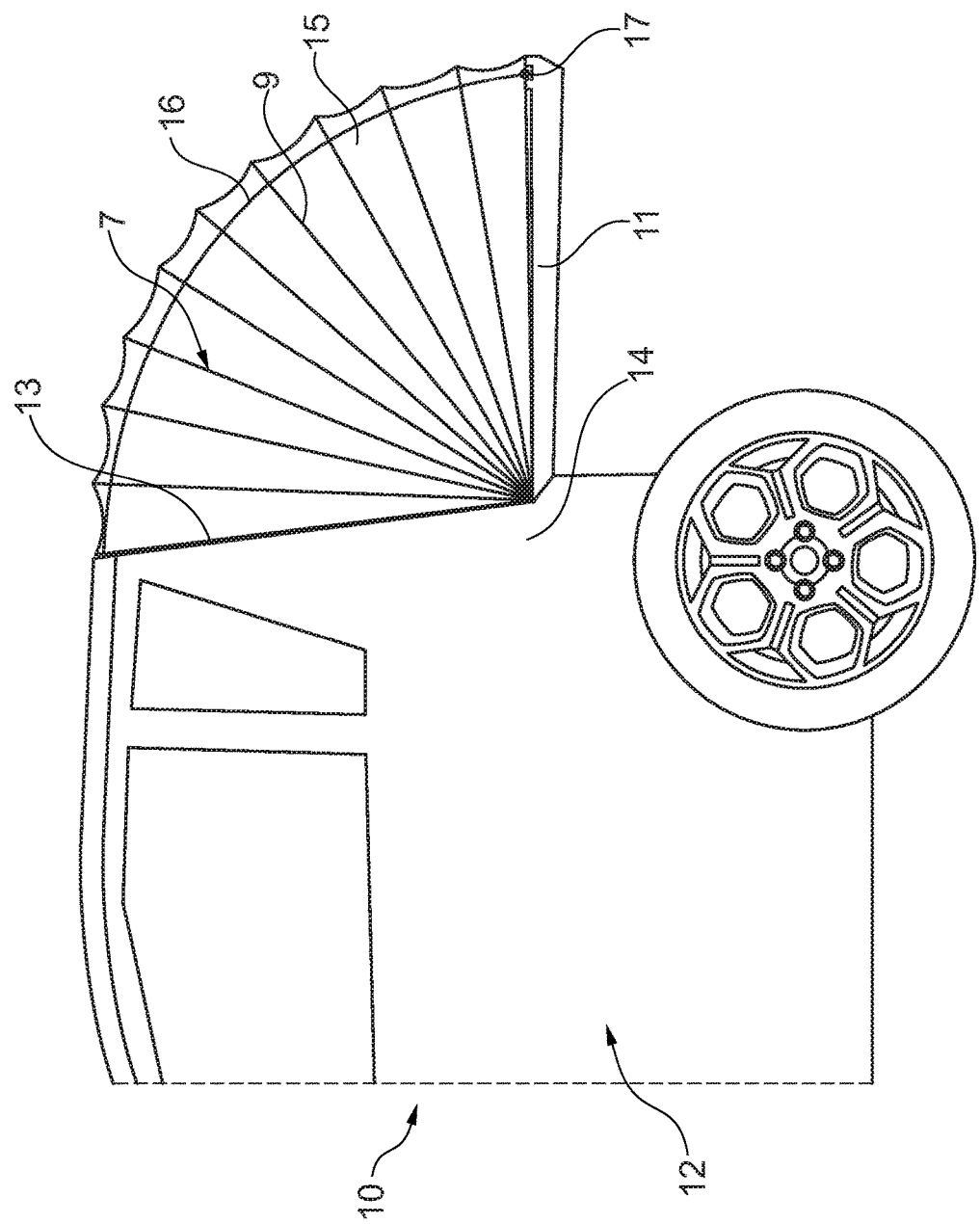
FIG. 8 is a diagrammatic side view of the motor vehicle shown in FIG. 6 with a cover in the function state.

FIG. 4 shows a diagrammatic side view of a further exemplary embodiment of a motor vehicle 10 according to one embodiment with the tailgate 11, which is arranged pivotably on a body 12 of the motor vehicle 10, in the closed position. The motor vehicle 10 also comprises a luggage compartment opening 13 arranged at the rear of the body 12, wherein the tailgate 11 closes the luggage compartment opening 13 when in the closed position shown, and opens the luggage compartment 13 when in the open position shown in FIG. 6. The tailgate 11 is connected to the body 12 on a side of the tailgate 11 nearer the ground via at least one hinge (not shown). In the open position, the tailgate 11 is oriented substantially horizontally, as shown in FIGS. 6 and 8.

Furthermore, the motor vehicle 10 has a cover 15 which is attached to a vehicle portion 14 of the motor vehicle 10 adjacent to the luggage compartment opening 13 and/or defining the luggage compartment opening 13, and which is made of a flexible, air-tight and water-tight material. The cover 15 is configured and arranged such that, by pivoting of the tailgate 11 into the open position, the cover 15 can be transferred from the compact rest state shown, in which the cover 15 is arranged spaced-savingly on the vehicle portion 14, into an extended function state shown in FIG. 8, in which the cover 15 is connected to the tailgate 11 and partially surrounds from above a space (not shown) between the tailgate 11 and the luggage compartment opening 13, and vice versa.

In the exemplary embodiment shown in FIGS. 4-8, the cover 15 is initially not connected to the tailgate 11, so the tailgate 11 is pivoted independently of the cover 15. The cover 15 has an identifiable fold structure so that the cover 15 is configured to be foldable in a predefined fashion. In particular, the motor vehicle 10 has a tensioning unit 7 connected to the tailgate 11 for tensioning the cover 15 in the extended function state, wherein the tensioning unit 7 has several tensioning brackets 9 arranged on the side, which can be pivoted via two hinges 8 (not shown).

The motor vehicle 10 also has a flexible rod 16 which, in the starting state shown in FIG. 4, is fixed at its free end (shown) to a receiver 17 on the tailgate 11. The flexible rod 16 is guided in a cavity (not shown) of the vehicle structure so as to be movable between a retracted state shown in FIG. 4 and an extended state shown in FIG. 8, so that in the retracted state of the flexible rod 16, only the shown free end of the rod 16 is free for coupling to the receiver 17. At least one stop (not shown) is arranged on the vehicle structure and cooperates with the other end portion of the rod 16 (not shown), such that the rod 16 cannot be fully withdrawn from the cavity.

Figure 5:
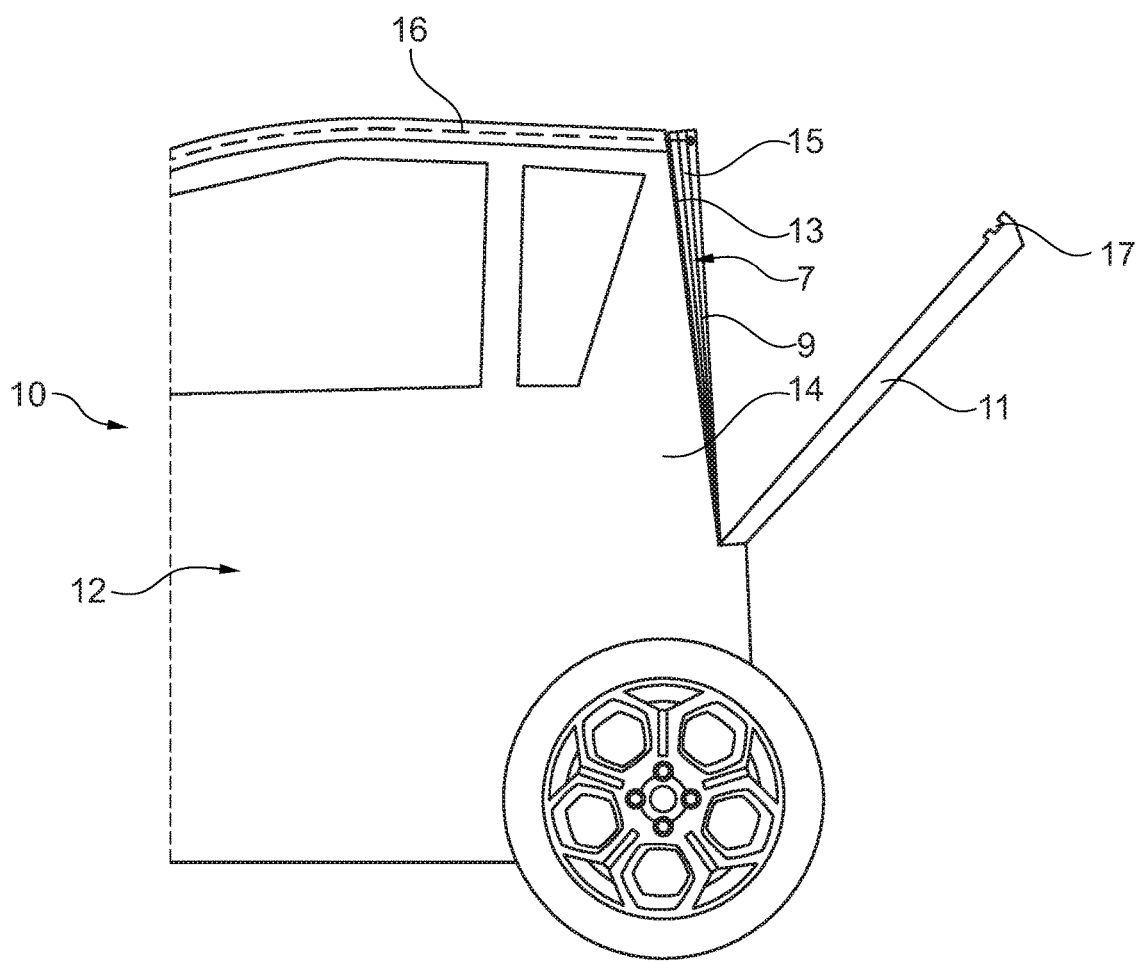
FIG. 5 is a diagrammatic side view of the motor vehicle shown in FIG. 4 with a partially pivoted tailgate.

FIG. 5 shows a diagrammatic side view of the motor vehicle 10 shown in FIG. 4 with a partially pivoted tailgate 11. The tailgate 11 is in a position between its closed position shown in FIG. 4 and its open position shown in FIGS. 6-8. The fixing between the rod 16 and the tailgate 11 has been released at the start of the pivot movement of the tailgate 11.

FIG. 6 shows a diagrammatic side view of the motor vehicle 10 shown in FIG. 4 with the tailgate 11 in the open position. The tailgate 11 is oriented horizontally and thus forms a support surface for objects which can be placed thereon.

Figure 7:
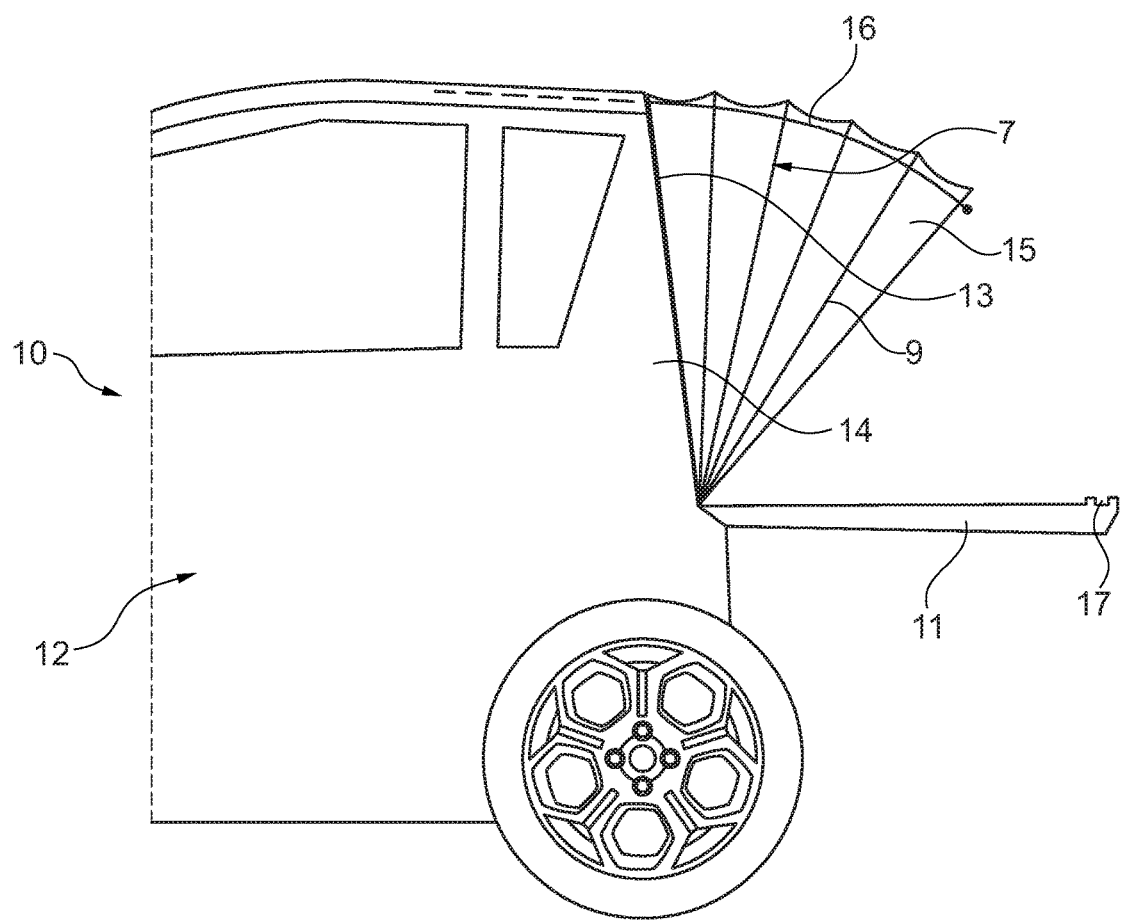
FIG. 7 is a diagrammatic side view of the motor vehicle shown in FIG. 6 with a partially extended cover.

FIG. 7 shows a diagrammatic side view of the motor vehicle 10 shown in FIG. 6 with the partially extended cover 15. In particular, the fold structure of the cover 15 and the tensioning unit 7 with its tensioning brackets 9 can be seen. When the cover 15 is partially extended, the rod 16 would be moved progressively at the same time.

FIG. 8 shows a diagrammatic side view of the motor vehicle 10 shown in FIG. 6 with the cover 15 in its function state. The cover 15 is fully tensioned and connected to the tailgate 11 via the rod 16.

Figure 9:
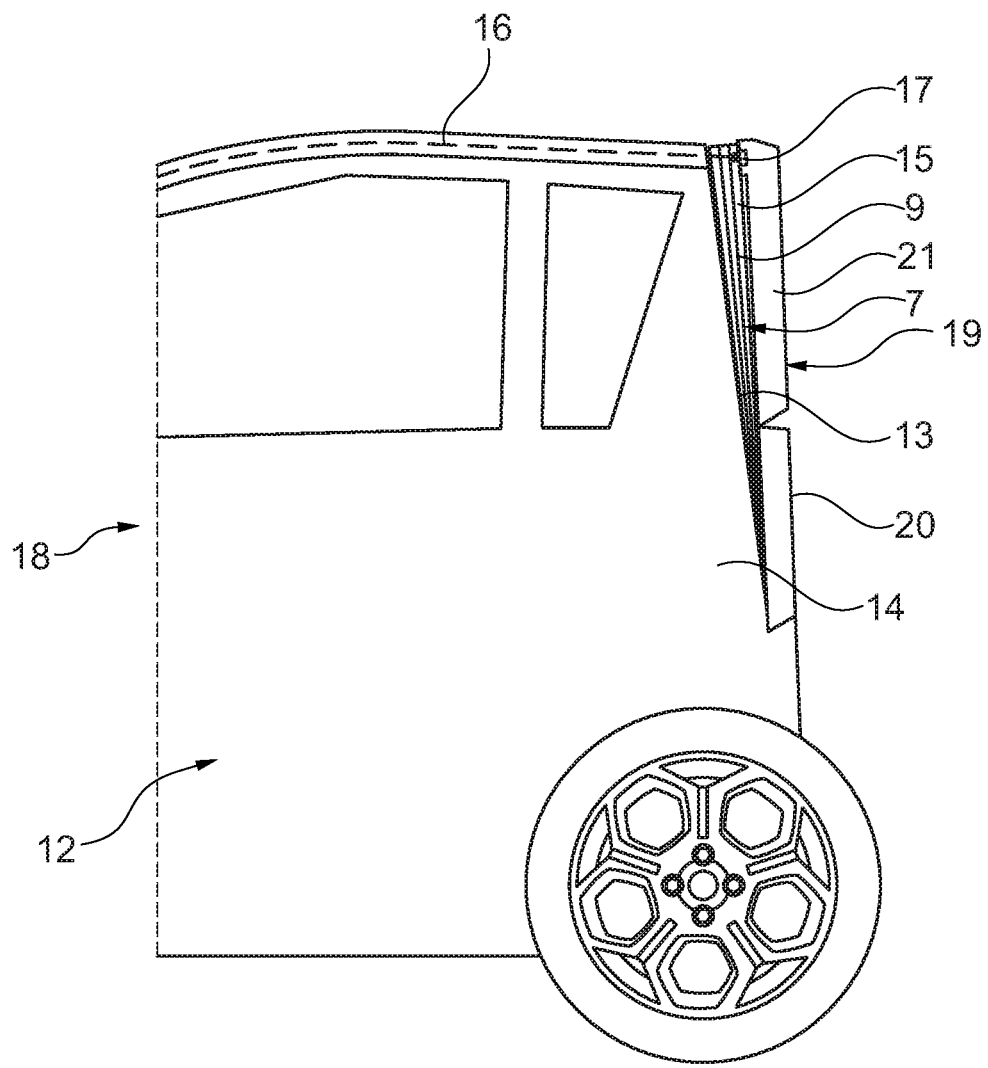
FIG. 9 is a diagrammatic side view of a further exemplary embodiment of a motor vehicle with the tailgate in the closed position.

FIG. 9 shows a diagrammatic side view of a further exemplary embodiment of a motor vehicle 18 according to one embodiment with the tailgate 19 in its closed position. In contrast to the exemplary embodiment shown in FIGS. 4-8, the tailgate 19 comprises, on a side of the tailgate 19 nearer to the ground, a lower tailgate element 20 connected to the body 12 via at least one hinge (not shown), and an upper tailgate element 21 connected via at least one hinge (not shown) to a side of the lower tailgate element 20 further away from the ground. When the tailgate 19 is in the open position shown in FIGS. 11-13, the upper tailgate element 21 is oriented substantially horizontally, and the lower tailgate element 20 is oriented substantially vertically. When the two tailgate elements 20 and 21 are aligned with each other, the tailgate 19 can be used as shown in FIGS. 4-8. The cover 15 and the tensioning unit 7 are preferably configured such that both the state shown in FIG. 8 and the state shown in FIG. 13 can be achieved. To avoid repetition, for the remaining description of the motor vehicle 18 shown in FIGS. 9-13, reference is made to the description above of the exemplary embodiment shown in FIGS. 4-8.

Figure 10:
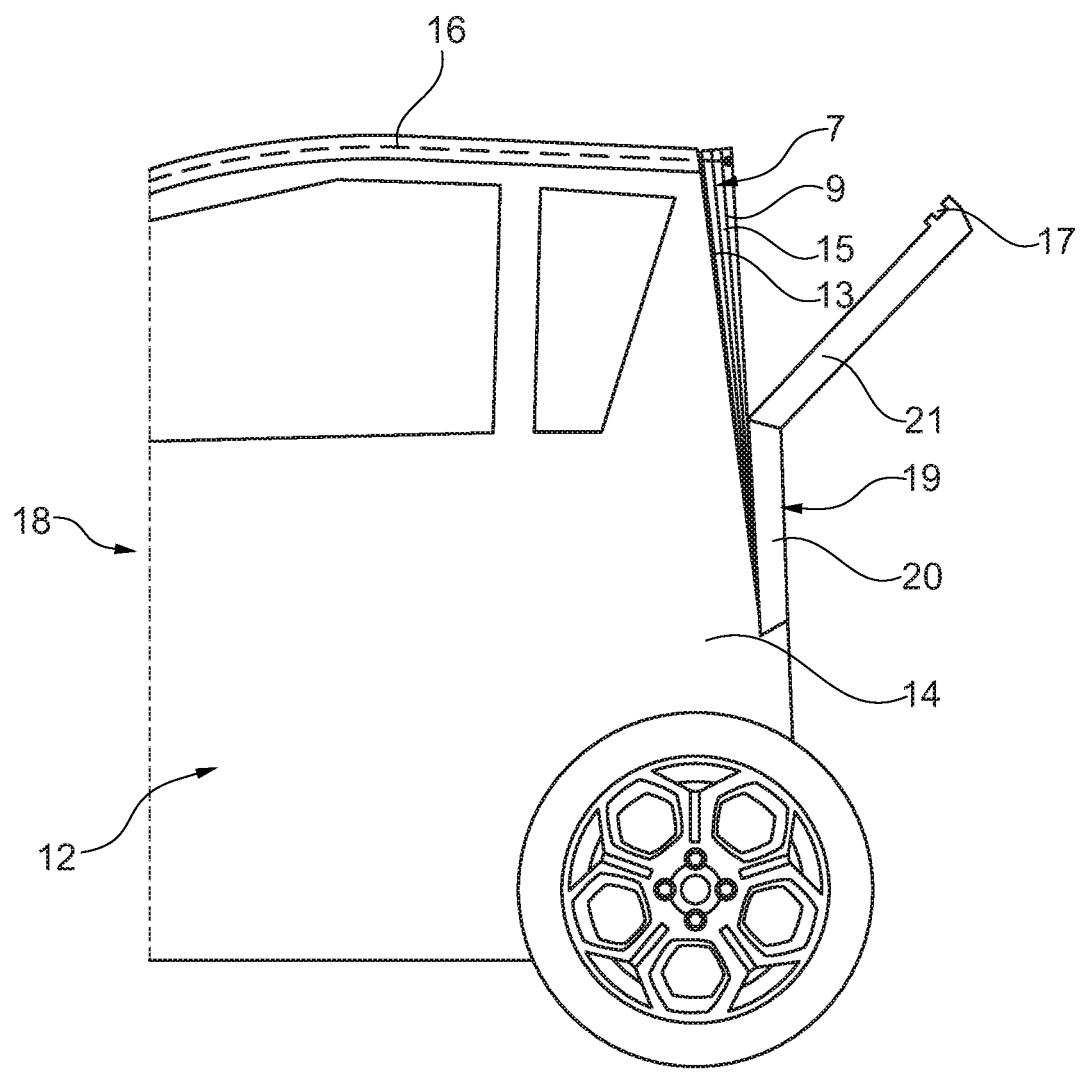
FIG. 10 is a diagrammatic side view of the motor vehicle shown in FIG. 9 with a partially pivoted tailgate.

FIG. 10 shows a diagrammatic side view of the motor vehicle 18 shown in FIG. 9 with a partially pivoted tailgate 19. In particular, the upper tailgate element 21 can be pivoted out of the closed position while the lower tailgate element 20 is still in the closed position. The fixing between the rod 16 and the tailgate 19 or the upper tailgate element 21 has been released at the start of the pivot movement of the tailgate 19 or the upper tailgate element 21.

Figure 11:
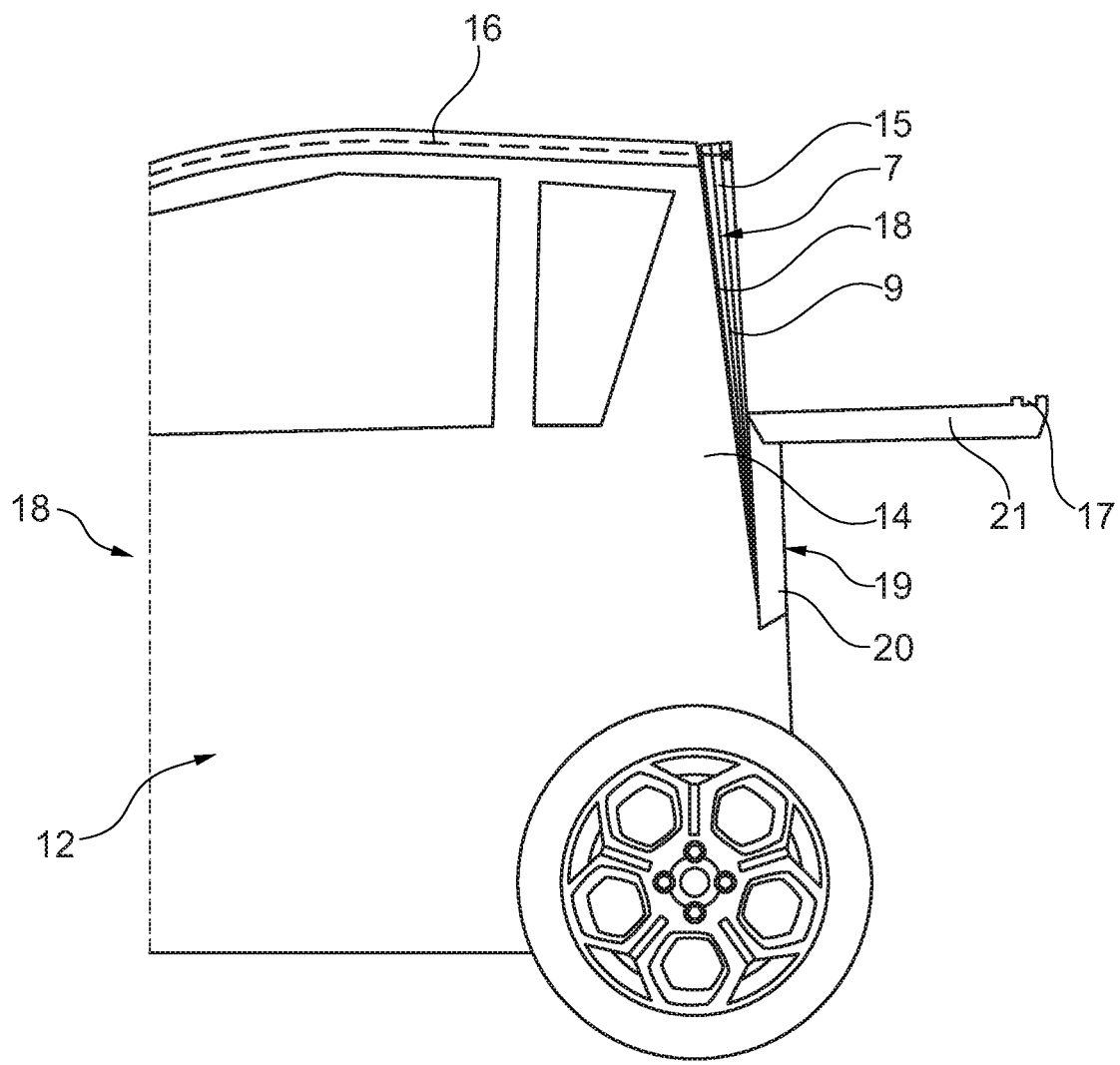
FIG. 11 is a diagrammatic side view of the motor vehicle shown in FIG. 9 with the tailgate in the open position.

FIG. 11 shows a diagrammatic side view of the motor vehicle 18 shown in FIG. 9 with the tailgate 19 in the open position. The upper tailgate portion 21 is oriented substantially horizontally and thus forms a support surface for objects which can be placed thereon.

Figure 12:
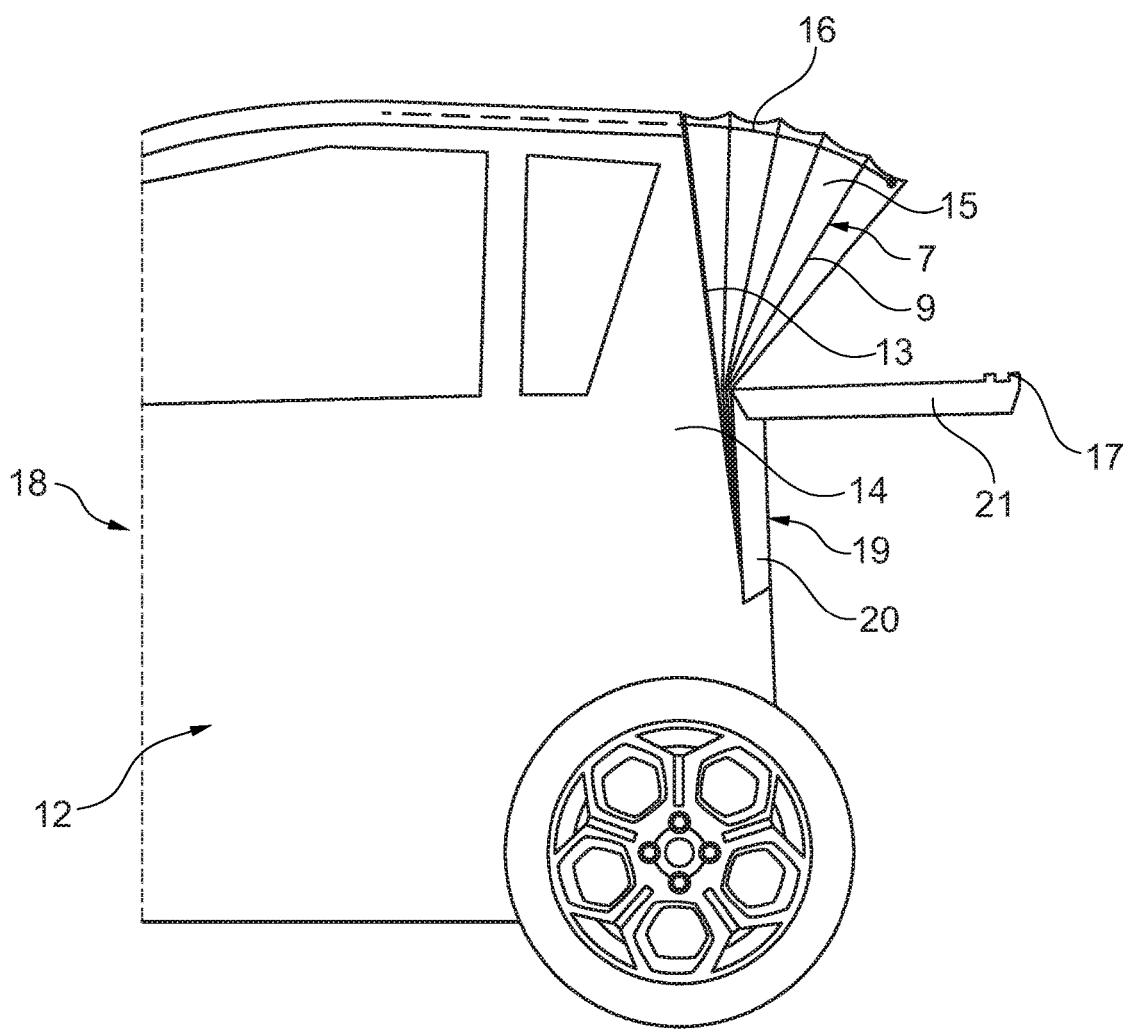
FIG. 12 is a diagrammatic side view of the motor vehicle shown in FIG. 11 with a partially extended cover.

FIG. 12 shows a diagrammatic side view of the motor vehicle 18 shown in FIG. 11 with the partially extended cover 15. In particular, the fold structure of the cover 15 and the tensioning unit 7 with its tensioning brackets 9 can be seen. When the cover 15 is partially extended, the rod 16 would be moved progressively at the same time.

Figure 13:
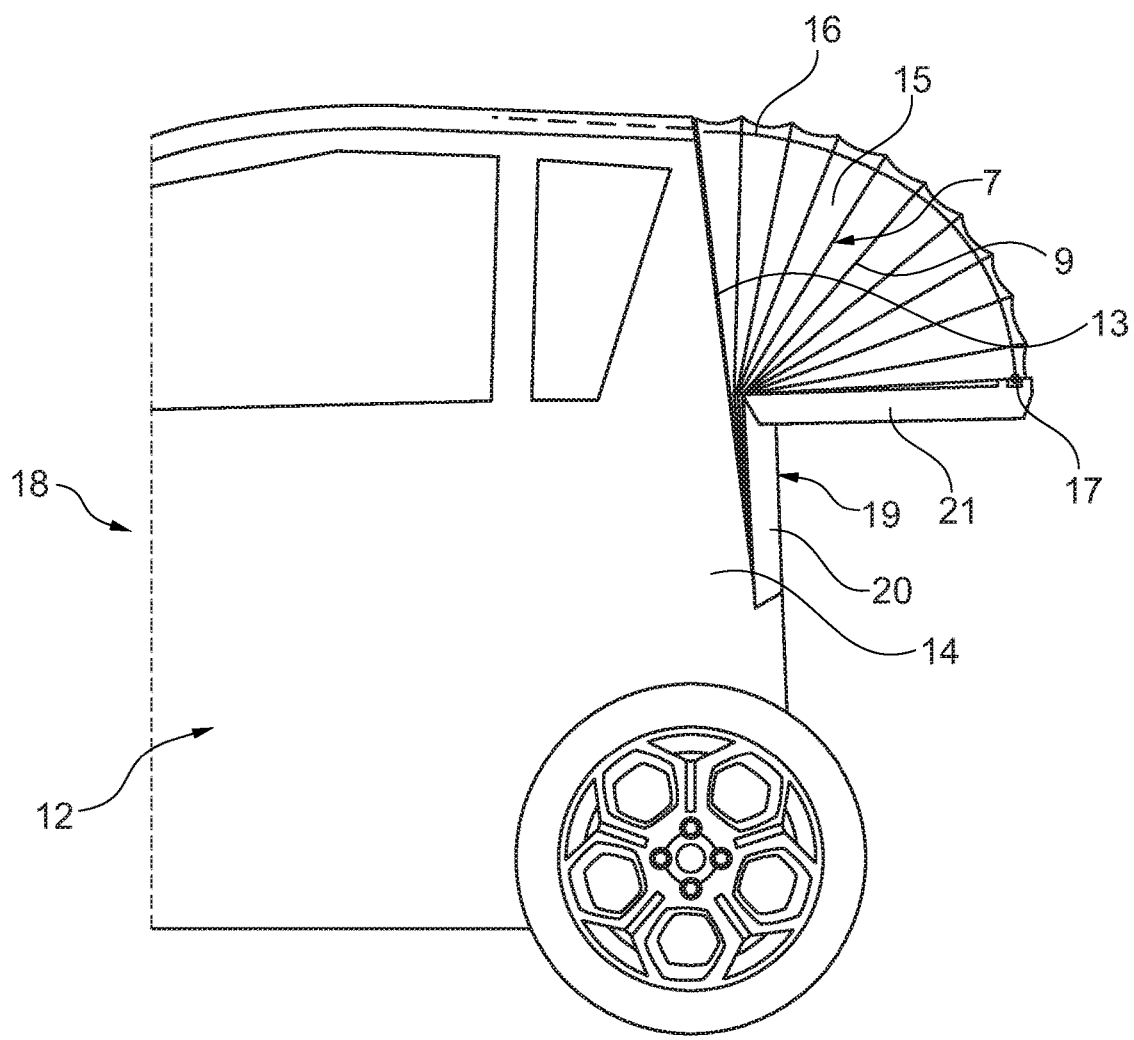
FIG. 13 is a diagrammatic side view of the motor vehicle shown in FIG. 11 with the cover in the function state.

FIG. 13 shows a diagrammatic side view of the motor vehicle 18 shown in FIG. 11 with the cover 15 in the function state. The cover 15 is fully tensioned and connected to the tailgate 19 via the rod 6.

Figure 14:
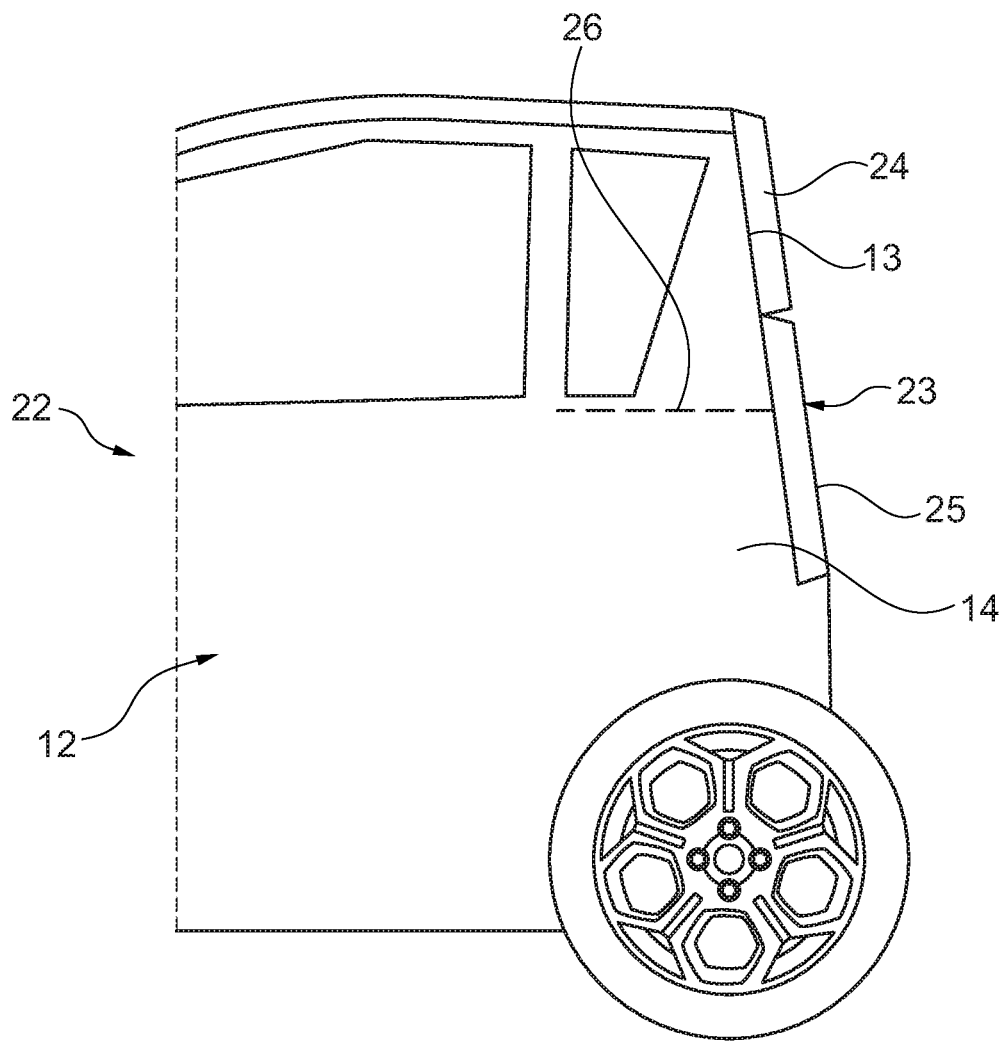
FIG. 14 is a diagrammatic side view of a further exemplary embodiment of a motor vehicle with the tailgate in the closed position.

FIG. 14 shows a diagrammatic side view of a further exemplary embodiment of a motor vehicle 22 according to one embodiment with the tailgate 23 in the closed position. In contrast to the exemplary embodiment shown in FIGS. 4-8, the tailgate 23 comprises, on a side of the tailgate 23 further from the ground, an upper tailgate element 24 connected to the body 12 via at least one hinge (not shown), and a lower tailgate element 25 connected via at least one hinge (not shown) to a side of the upper tailgate element 24 nearer to the ground. When the tailgate 23 is in the open position shown in FIGS. 16-18, the upper tailgate element 24 is oriented substantially horizontally, and the lower tailgate element 25 is oriented substantially vertically. When the two tailgate elements 24 and 25 are aligned with each other, the tailgate 23 as a whole can be brought into a horizontal position. To avoid repetition, for the remaining description of the motor vehicle 22 shown in FIGS. 14-18, reference is made to the description above of the exemplary embodiment shown in FIGS. 4-8.

Figure 16:
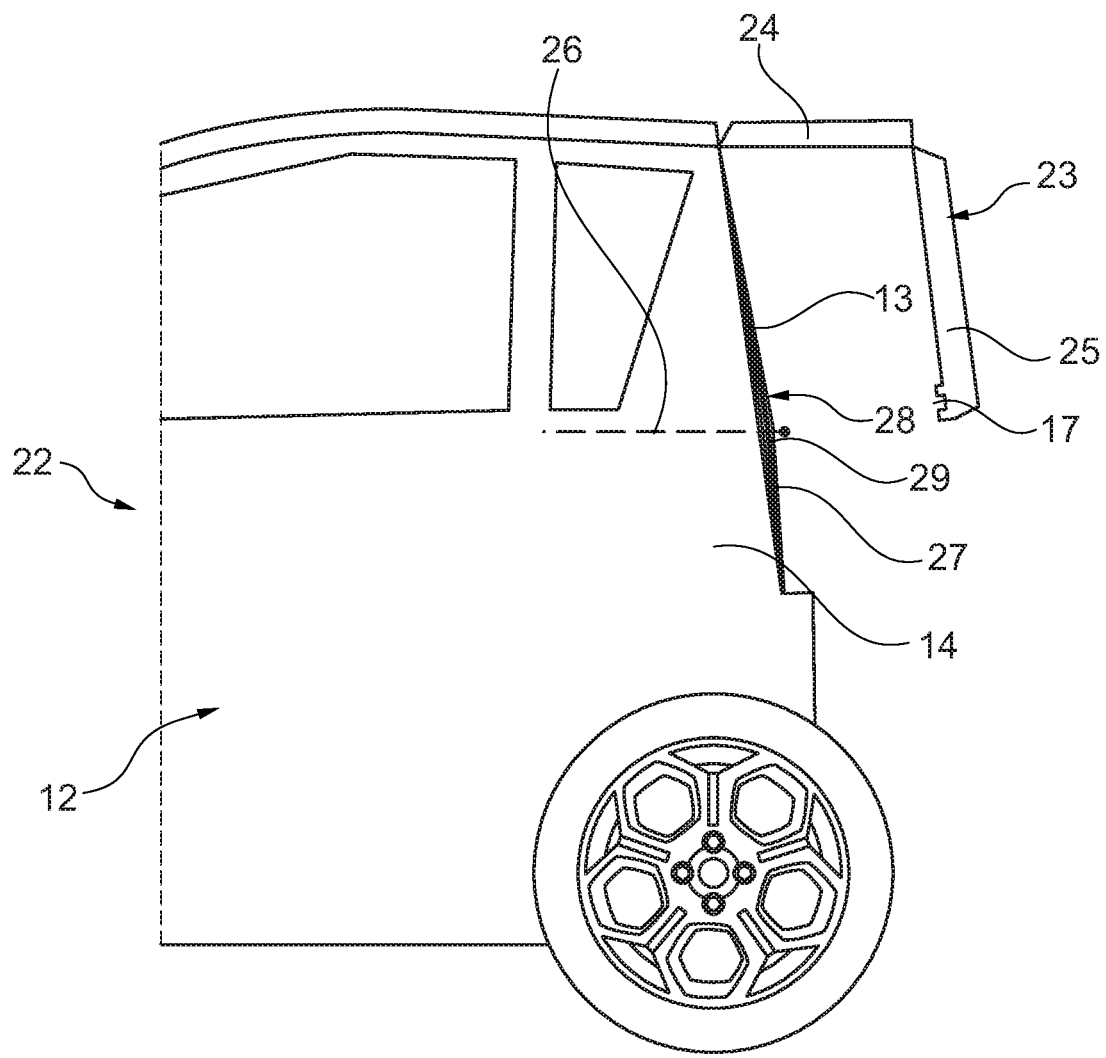
FIG. 16 is a diagrammatic side view of the motor vehicle shown in FIG. 14 with the tailgate in the open position.
Figure 17:
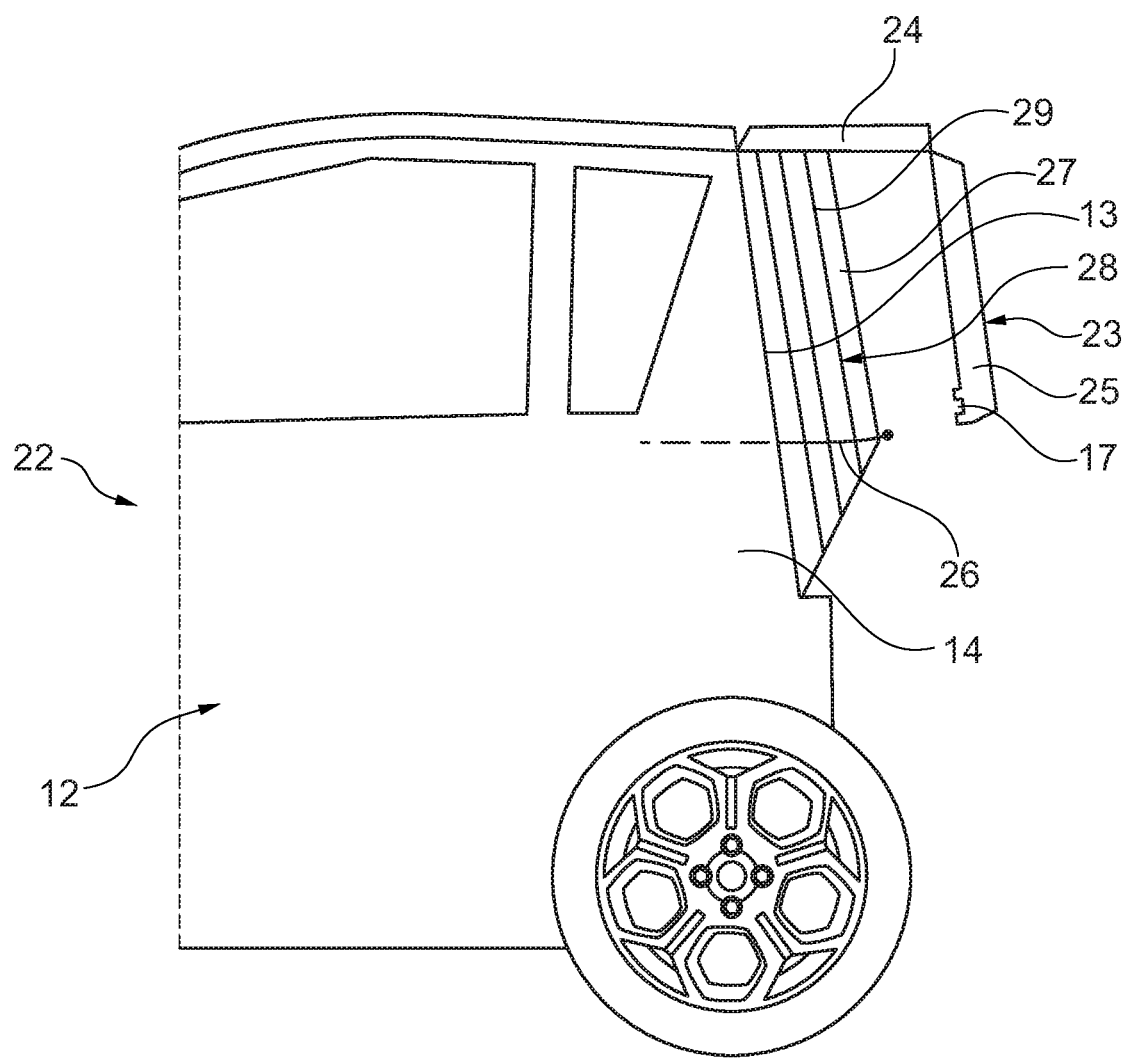
FIG. 17 is a diagrammatic side view of the motor vehicle shown in FIG. 16 with a partially extended cover.
Figure 18:
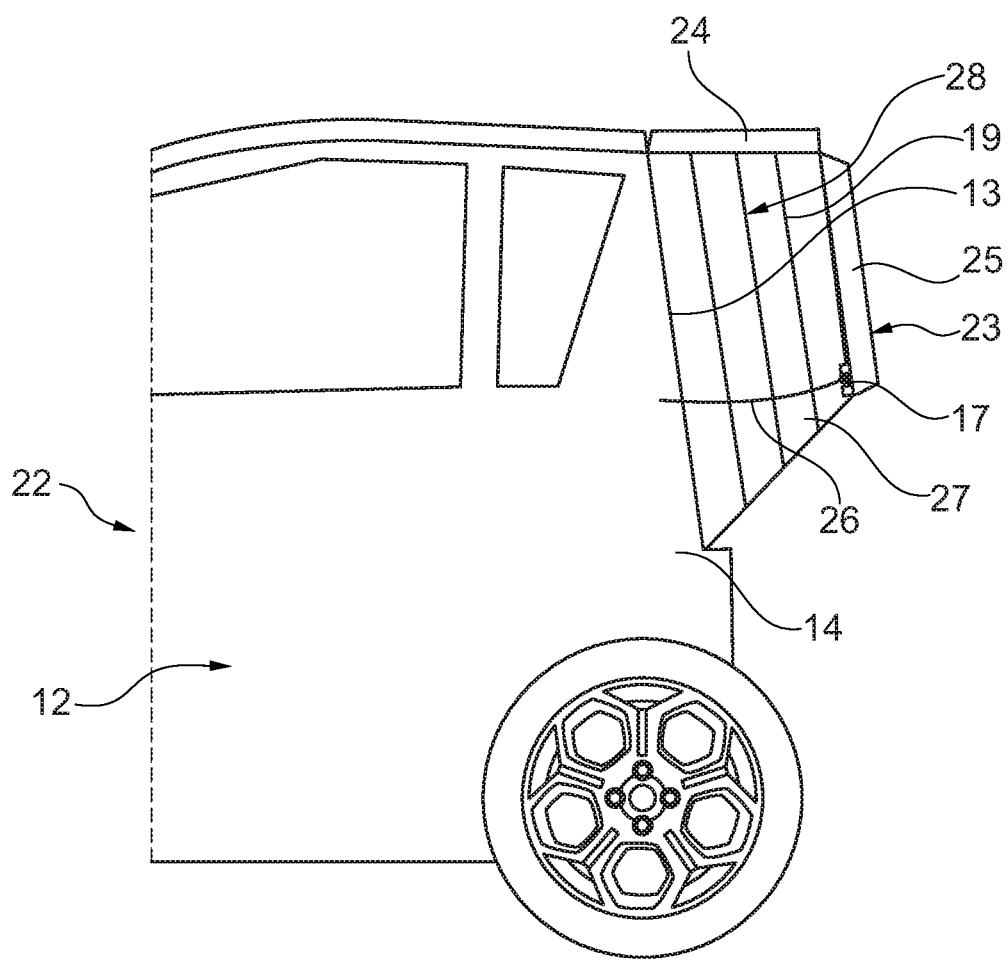
FIG. 18 is a diagrammatic side view of the motor vehicle shown in FIG. 16 with the cover in the function state.

The motor vehicle 22 furthermore has a cover, shown in FIGS. 15-18, which is attached to the vehicle portion 14 of the motor vehicle 22 adjacent to the luggage compartment opening 13 and/or defining the luggage compartment opening 13, and made of a flexible, air-tight and water-tight material. The cover is configured and arranged such that, with the tailgate 23 is in the open position shown in FIG. 18, the cover can be transferred from a compact rest state shown in FIG. 15, in which the cover is arranged spaced-savingly on the vehicle portion 14, into an extended function state shown in FIG. 18, in which the cover is connected to the tailgate 23 and at least partially surrounds a space between the tailgate 23 and the luggage compartment opening 13, and vice versa. FIGS. 15-18 show that the cover has a fold structure so that the cover is configured to be foldable in a predefined fashion. Also, the motor vehicle 22 comprises a tensioning unit, shown in FIGS. 15-18 and connected to the tailgate 23, for tensioning the cover in the extended function state. Furthermore, the motor vehicle 22 comprises a flexible rod 26 which, in the end state shown in FIG. 18, is fixed to a receiver on the tailgate 23 shown in FIGS. 15-18. The flexible rod 26 is guided in a cavity (not shown) of the vehicle structure so as to be movable between a retracted state, shown in FIG. 14, and an extended state, shown in FIG. 18, so that in the retracted state of the flexible rod 26, only the shown free end of the rod 26 is free for coupling to the receiver 17. At least one stop (not shown) is arranged on the vehicle structure and cooperates with the other end portion of the rod 26 (not shown), such that the rod 26 cannot be fully withdrawn from the cavity.

Figure 15:
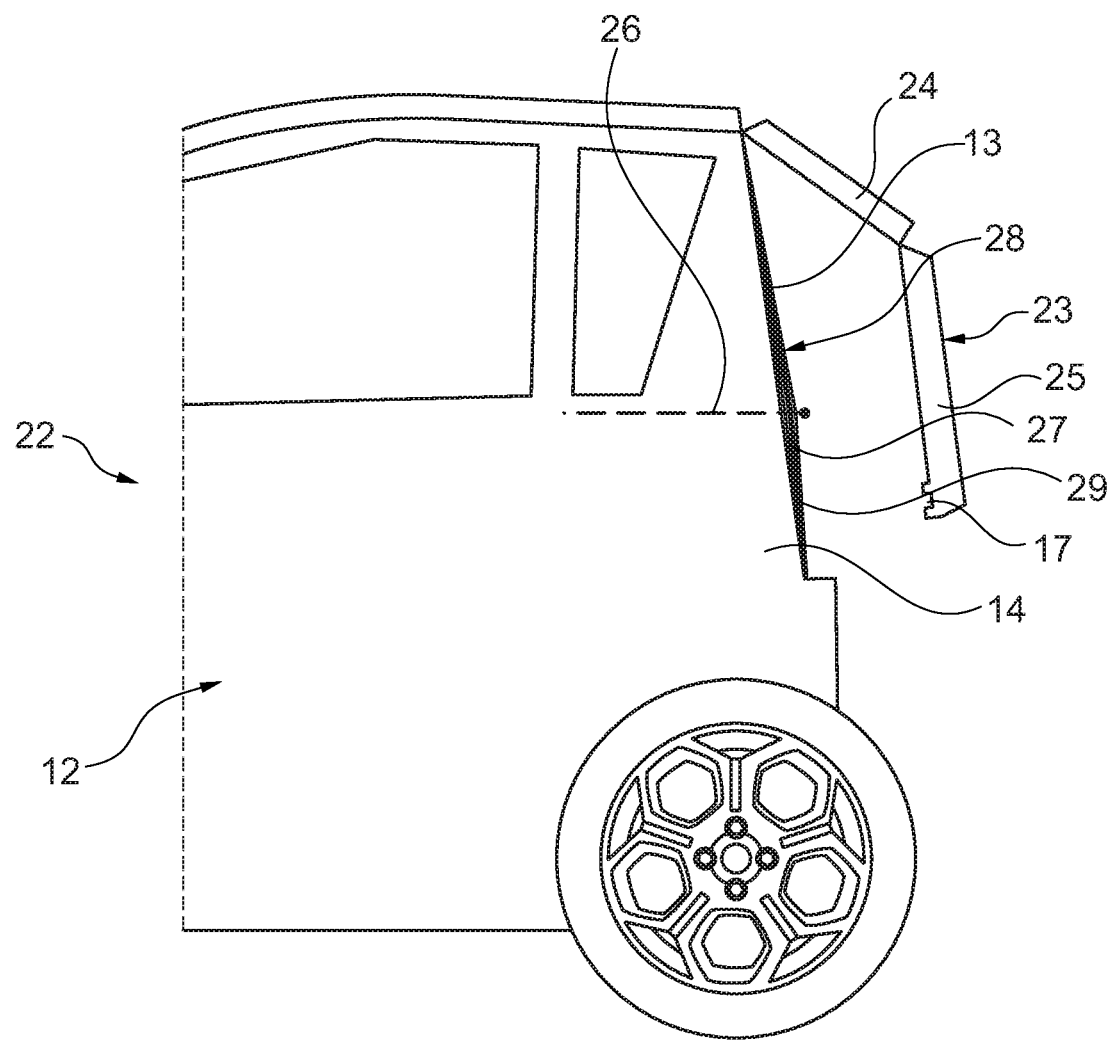
FIG. 15 is a diagrammatic side view of the motor vehicle shown in FIG. 14 with a partially pivoted tailgate.

FIG. 15 shows a diagrammatic side view of the motor vehicle 22 shown in FIG. 14 with a partially pivoted tailgate 23. For this, the upper tailgate portion 24 is pivoted relative to the body 12, and the lower tailgate element 25 is pivoted relative to the upper tailgate element 24. The cover 27 is in the compact rest state. The tensioning unit 28 with tensioning brackets 29 is also in a compact starting state. Also, the receiver 17 on the tailgate 23 or the lower tailgate element 25 can be seen, to which the shown free end of the rod 26 can be fixed, as depicted in FIG. 18.

FIG. 16 shows a diagrammatic side view of the motor vehicle 22 shown in FIG. 14 with the tailgate 23 in the open position. For this, the tailgate elements 24 and 25 are pivoted further, so that the upper tailgate element 24 is oriented substantially horizontally and the lower tailgate element 25 is oriented substantially vertically.

FIG. 17 shows a diagrammatic side view of the motor vehicle 22 shown in FIG. 16 with partially extended cover 27. In particular, the tensioning unit 28 with its tensioning brackets 29 can be seen. When the cover 27 is partially extended, the rod 26 would be moved progressively at the same time.

FIG. 18 shows a diagrammatic side view of the motor vehicle 22 shown in FIG. 16 with the cover 27 in the function state. The cover 27 is fully tensioned and connected to the tailgate 23 via the rod 26.

Figure 19:
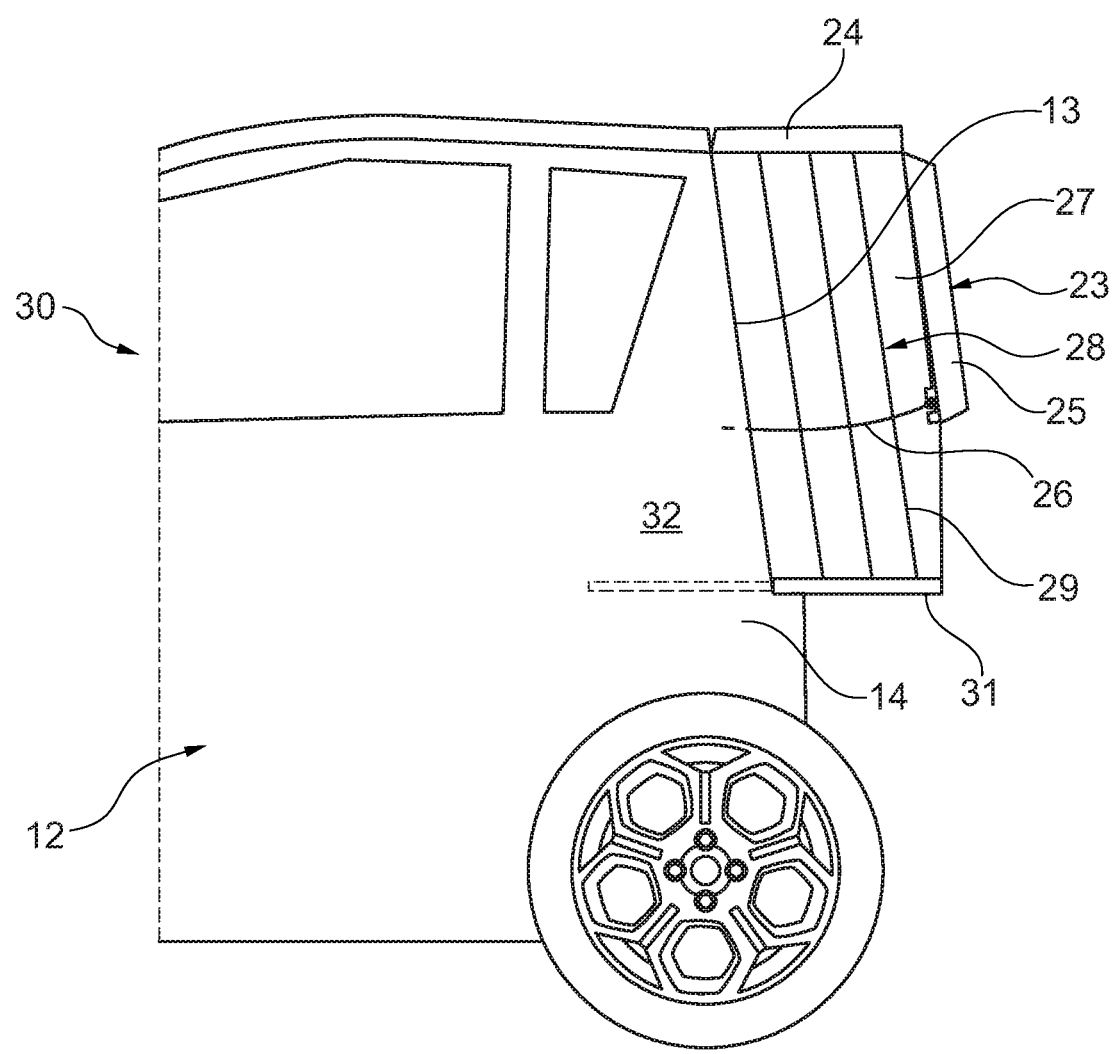
FIG. 19 is a diagrammatic side view of a further exemplary embodiment of a motor vehicle with the tailgate in the open position.

FIG. 19 shows a diagrammatic side view of a further exemplary embodiment of a motor vehicle 30 according to one embodiment with the tailgate 23 in the open position. This motor vehicle 30 differs from the exemplary embodiment shown in FIGS. 14-18 in particular in that the motor vehicle 30 also has a floor element 31, which is arranged on the motor vehicle 30 so as to be movable between a retracted position (not shown), in which the floor element 31 is arranged completely inside a luggage compartment 32 of the motor vehicle 30 accessible via the luggage compartment opening 32, and an extended position in which the floor element 31, as shown in FIG. 19, protrudes partially to the rear out of the luggage compartment 32. To avoid repetition, with regard to the description of the motor vehicle 30 shown in FIG. 19, reference is made to the description above of the exemplary embodiment shown in FIGS. 14-18.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle comprising:
   a body;
   at least one luggage compartment opening arranged at a rear of the body;
   at least one tailgate arranged pivotably on the body and in a closed position closes the luggage compartment opening and in an open position at least partially opens the luggage compartment opening;
   at least one cover attached to a vehicle portion of the motor vehicle adjacent to the luggage compartment opening and which is made of a flexible material and is configured and arranged such that, in the open position of the tailgate or by pivoting of the tailgate into the open position, the cover can be transferred from a compact rest state in which the cover is arranged on the vehicle portion, into an extended function state in which the cover is connected to the tailgate, and at least partially surrounds a space between the tailgate and the luggage compartment opening; and
   at least one flexible rod which is guided in a cavity on a vehicle structure of the motor vehicle so as to be movable between a retracted state and an extended state, and at least one receiver arranged on the tailgate to which a free end of the rod can be fixed, wherein at least one stop is arranged on the vehicle structure which cooperates with the other end portion of the rod such that the rod cannot be withdrawn completely from the cavity.

2. The motor vehicle as claimed in claim 1, wherein the cover is made from an air-tight and/or water-tight material.

3. The motor vehicle as claimed in claim 1, wherein the cover has a fold structure so that the cover is configured to be foldable in a predefined fashion.

4. The motor vehicle as claimed in claim 1 further comprising at least one tensioning unit which can be connected to the tailgate for tensioning the cover in the extended function state.

5. The motor vehicle as claimed in claim 1, wherein on a side of the tailgate nearer to ground, the tailgate is connected to the body via at least one hinge, and in the open position is oriented substantially horizontally.

6. The motor vehicle as claimed in claim 1, wherein on a side of the tailgate nearer to ground, the tailgate has a lower tailgate element connected to the body via at least one hinge, and an upper tailgate element connected via at least one hinge to a side of the lower tailgate element further from the ground, wherein when the tailgate is in the open position, the upper tailgate element is oriented substantially horizontally and the lower tailgate element is oriented substantially either vertically or horizontally.

7. The motor vehicle as claimed in claim 1, wherein on a side of the tailgate further from ground, the tailgate has an upper tailgate element connected to the body via at least one hinge, and a lower tailgate element connected via at least one hinge to a side of the upper tailgate element nearer to the ground, wherein when the tailgate is in the open position, the upper tailgate element is oriented substantially horizontally and the lower tailgate element is oriented substantially either vertically or horizontally.

8. The motor vehicle as claimed in claim 7, wherein at least one floor element is arranged on the motor vehicle so as to be movable between a retracted position, in which the floor element is arranged completely inside a luggage compartment of the motor vehicle accessible via the luggage compartment opening, and an extended position in which the floor element protrudes at least partially to the rear out of the loading compartment.

9. A vehicle comprising:
a body;
a luggage compartment opening arranged at a rear of the body;
a tailgate arranged pivotably on the body to pivot between closed and open positions, wherein on a side of the tailgate nearer to ground, the tailgate has a lower tailgate element connected to the body via at least one hinge, and an upper tailgate element connected via at least one hinge to a side of the lower tailgate element further from the ground, wherein when the tailgate is in the open position, the upper tailgate element is oriented substantially horizontally and the lower tailgate element is oriented substantially either vertically or horizontally; and
a flexible cover configured to be transferred between a compact state and an extended state that at least partially surrounds a space between the tailgate and the luggage compartment opening.

10. The vehicle as claimed in claim 9, wherein the cover moves from the compact state to the extended state by the tailgate being in the open position or pivoting of the tailgate into the open position.

11. The vehicle as claimed in claim 9, wherein the cover is attached to a vehicle portion of the motor vehicle adjacent to the luggage compartment opening and/or defining the luggage compartment opening.

12. The vehicle as claimed in claim 9, wherein the cover is made from an air-tight and/or water-tight flexible material.

13. The vehicle as claimed in claim 9, wherein the cover has a fold structure so that the cover is configured to be foldable in a predefined fashion.

14. The vehicle as claimed in claim 9 further comprising at least one tensioning unit which can be connected to the tailgate for tensioning the cover in the extended state.

15. The vehicle as claimed in claim 9 further comprising at least one flexible rod which is guided in a cavity on a vehicle structure of the motor vehicle so as to be movable between a retracted state and an extended state, and at least one receiver arranged on the tailgate to which a free end of the rod can be fixed, wherein at least one stop is arranged on the vehicle structure which cooperates with the other end portion of the rod such that the rod cannot be withdrawn completely from the cavity.

16. The vehicle as claimed in claim 9, wherein on a side of the tailgate nearer to ground, the tailgate is connected to the body via at least one hinge, and in the open position is oriented substantially horizontally.

17. A vehicle comprising:
a body;
a luggage compartment opening arranged at a rear of the body;
a tailgate arranged pivotally on the body to pivot between closed and open positions, wherein on a side of the tailgate further from ground, the tailgate has an upper tailgate element connected to the body via at least one hinge, and a lower tailgate element connected via at least one hinge to a side of the upper tailgate element nearer to the ground, wherein when the tailgate is in the open position, the upper tailgate element is oriented substantially horizontally and the lower tailgate element is oriented substantially either vertically or horizontally; and
a flexible cover configured to be transferred between a compact state and an extended state that at least partially surrounds a space between the tailgate and the luggage compartment opening.

18. The vehicle as claimed in claim 17, wherein at least one floor element is arranged on the motor vehicle so as to be movable between a retracted position, in which the floor element is arranged completely inside a luggage compartment of the motor vehicle accessible via the luggage compartment opening, and an extended position in which the floor element protrudes at least partially to the rear out of the loading compartment.

\* \* \* \* \*